(12) United States Patent
Ogo et al.

(10) Patent No.: US 6,608,748 B1
(45) Date of Patent: Aug. 19, 2003

(54) DISPLAY DEVICE

(75) Inventors: Ikuo Ogo, Kumamoto (JP); Yoshihide Nishida, Kumamoto (JP); Masayuki Kawano, Kumamoto (JP); Hisashi Ohta, Kumamoto (JP); Kazutoshi Shimojo, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 417 days.

(21) Appl. No.: 09/637,868

(22) Filed: Aug. 15, 2000

(30) Foreign Application Priority Data

Aug. 25, 1999 (JP) .......................................... 11-237828

(51) Int. Cl.⁷ ................................................ G06F 1/16
(52) U.S. Cl. ...................... 361/681; 361/684; 345/905; 341/22; 248/917
(58) Field of Search ........................ 361/681, 679–680, 361/682–684; 248/917–924; 345/87, 905; 340/718–719; 341/22; 313/493

(56) References Cited

U.S. PATENT DOCUMENTS 5,483,253 A * 1/1996 Suganuma et al. ......... 361/681
6,392,873 B1 * 5/2002 Honda ........................ 361/681
6,498,631 B2 * 12/2002 Natsuyama .................. 349/62

FOREIGN PATENT DOCUMENTS

| JP | 8-70188 | 3/1996 |
| JP | 9-297542 | 11/1997 |
| JP | 3051361 | 6/1998 |
| JP | 11-6998 | 1/1999 |

* cited by examiner

Primary Examiner—Darren Schuberg
Assistant Examiner—Hung Van Duong
(74) Attorney, Agent, or Firm—McDermottt, Will & Emery

(57) ABSTRACT

In order to prevent the display quality of a display device from deteriorating due to an external stress, a liquid crystal panel for displaying images and characters, and an illuminator for projecting light from the back of the liquid crystal panel are supported by a mold frame (1) in FIG. 3 and a front frame fixed to the mold frame (1). The mold frame (1) is formed with mounting holes for attaching the liquid crystal panel to an external device such as personal computer, and is at its corners with cutouts (20) for absorbing the external stresses which are propagated through the mounting holes in a state where the display device is attached to the external device.

15 Claims, 8 Drawing Sheets

Fig. 4(a)
Fig. 4(b)
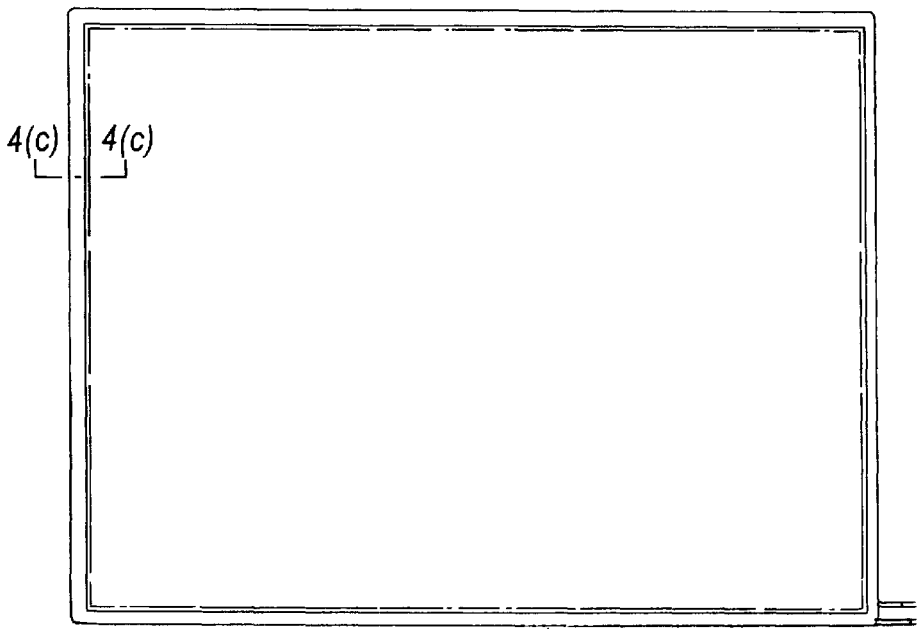
Fig. 4(c)
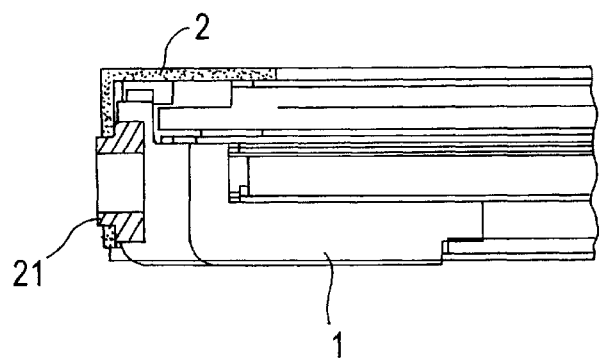

Fig. 8(a)
(PRIOR ART)
Fig. 8(b)
(PRIOR ART)
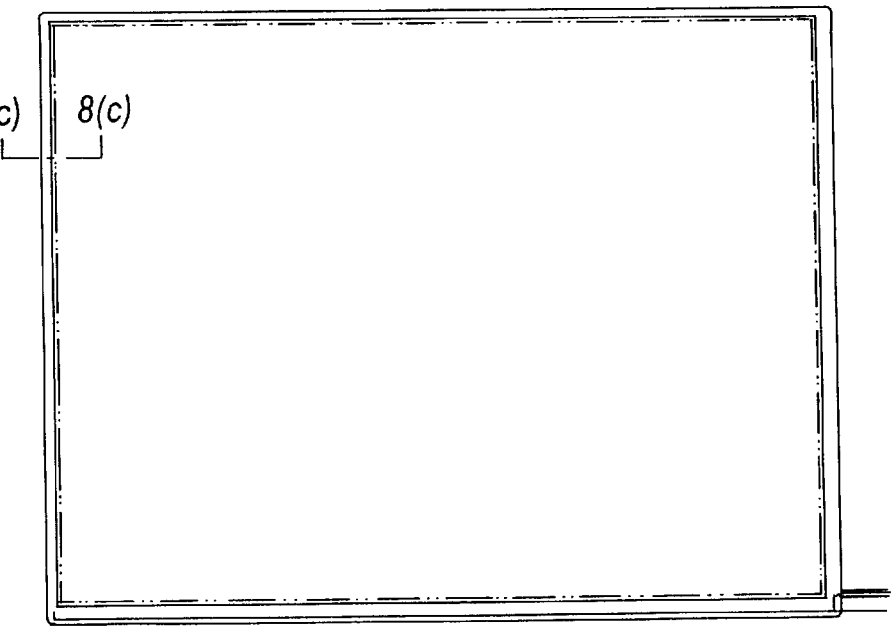
Fig. 8(c)
(PRIOR ART)
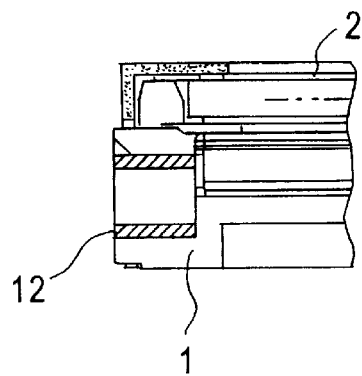

DISPLAY DEVICE

BACKGROUND OF THE INVENTION

1. Field of the Invention

This invention relates to a display device of flat type for displaying images and characters, and more particularly to the structure of the flat display device.

2. Description of the Related Art

Display devices of flat type for displaying images and characters have been proposed and put into commodities as a device which utilizes the optical rotatory power of a liquid crystal, one which utilizes electroluminescence, one which utilizes plasma light emission, one in which minute electron guns are arranged in the shape of an array in a number corresponding to pixels, one in which minute optical reflectors are arranged in the shape of an array in a number corresponding to pixels, and so forth. At present, the devices employing the liquid crystals are extensively put into practical use. Here, the prior art will be explained concerning the liquid-crystal display device which applies the optical rotatory power of the liquid crystal.

The general liquid-crystal display device is constructed of a liquid crystal panel in which a liquid crystal material is sandwiched in between two opposing substrates, circuit portions which drive the liquid crystal panel, an illuminator which is disposed behind the liquid crystal panel, and mechanical members which serve to hold the liquid crystal panel, the driver circuits and the illuminator in a desired positional relationship. Display devices for some purposes are of the reflection type which does not include the illuminator and which utilizes light entering from outside.

The mechanical members are formed chiefly of a resin and a metal, and they are usually formed with mounting holes, threaded holes, hooks or the likes for holding the liquid crystal panel at a desired position. The liquid-crystal display device attached to a desired external device should ideally be used in a state where it does not undergo an oppression or such an external deformation as torsion or warp. More specifically, in a case where a stress exerted from outside has been propagated to the liquid crystal panel, the interval between the two substrates for holding the liquid crystal therebetween changes from a set value locally, thereby to incur such a deterioration in a display quality that a contrast changes, that a striped inferior display arises, or that white spots appear locally due to the change of a optical rotational state attributed to the stress.

Besides, when the whole liquid-crystal display device has been twisted or bent, the display quality might not be affected, but a wiring line for sending a signal to a pixel at which the liquid crystal is driven undergoes such a stress as tension or warp, and the breaking of the wiring line occurs to incur a deterioration in reliability. Accordingly, there has been adopted a structure wherein the oppression or deformation from the housing of the external device to which the display device is attached is made difficult to be propagated to the display device. By way of example, the rigidity of the housing for attaching the display device is heightened as disclosed in the official gazette of Japanese Patent Application Laid-open No. 6998/1999 or Japanese Utility Model Registration No. 3051361, or a buffer material such as rubber is interposed between the display device and the housing for attaching it as disclosed in the official gazette of Japanese Patent Application Laid-open No. 70188/1996 or No. 297542/1997.

Further, the liquid-crystal display device in the prior art has been designed with the intention of bestowing a certain degree of self-defensive durability against the stress exerted through the mounting holes. More specifically, the mechanical members are configured of a mold frame formed of the resin, and a front frame formed of the metal. In some cases, the liquid crystal panel, and the illuminator with a light source, an optical guide plate and other necessary constituents assembled in the mold frame beforehand, are incorporated as reinforcement members against the external stress, so as to heighten the rigidity of the liquid-crystal display device as a module to the utmost by the combination of such members.

FIG. 6 is a perspective view showing a technique for enhancing a rigidity in a liquid-crystal display device in the prior art. It illustrates an example for heightening the rigidity.

Referring to FIG. 6, numeral 1 designates a mold frame which is formed of a resin and which constructs a mechanical member, while numeral 2 designates a front frame which is formed of a metal and which constructs another mechanical member. Numerals 3 indicate mounting hole portions which are formed in the mold frame 1.

In the example of FIG. 6, the mounting hole portions 3 for holding a liquid crystal panel at a desired position has the rigidity ensured by a structure in which the mold frame 1 formed of the resin is concealed with the metal-made front frame 2 subjected to a drawing work.

In addition, FIG. 7 is a fragmentary view showing a sectional structure in which a gap is defined between a liquid crystal panel and an illuminator in a liquid-crystal display device in the prior art.

Referring to FIG. 7, numerals 1 and 2 designate the same components as those in FIG. 6, respectively. Further included are the liquid crystal panel 4, a lamp 5 which serves as the light source of the liquid crystal panel 4, a lamp reflector 6 which reflects the light of the lamp 5, a lamp reflector cover 7 which protects the lamp reflector 6, an optical guide plate 8 which is formed so as to propagate the emitted light of the lamp 5 to the whole display area and to uniformly illuminate the whole display panel, and an optical sheet 9 which derives light emergent from the optical guide plate 8, onto the side of the face of the liquid-crystal display device more uniformly and more efficiently. A cushion material 10 is interposed between the liquid crystal panel 4 and the optical sheet 9.

As shown in FIG. 7, appropriate gaps are defined between the liquid crystal panel 4 and the illuminator, and between the liquid crystal panel 4 and the metal-made front frame 2. Thus, it is taken into consideration that, even in a case where the liquid-crystal display device has been deformed by a stress, such as torsion or warp, exerted on this liquid-crystal display device, the stress is prevented from being propagated to the liquid crystal panel 4 and the circuit components, which are the cores of the liquid-crystal display device, thereby to avoid any deterioration in the display quality of the liquid-crystal display device.

There has also been a structure as shown in FIGS. 8(a) through 8(c).

FIGS. 8(a) through 8(c) show the structure of a mounting hole portion in the case of side-mounting a liquid-crystal display device. Concretely, FIG. 8(a) is a side view of the whole liquid-crystal display device, FIG. 8(b) is a plan view of the whole device, and FIG. 8(c) is an enlarged sectional view of the mounting hole portion taken along A—A indicated in FIG. 8(b).

Referring to FIGS. 8(a) through 8(c), numerals 1 and 2 designate the same components as those in FIG. 6, respectively. Numeral 12 indicates a nut which is embedded in the mold frame 1.

With the side-mounting scheme shown in FIGS. 8(a) through 8(c), the nut 12 is embedded in the mold frame 1 formed of a resin, and the liquid-crystal display device is fixed at a desired position by employing the nut 12. The adoption of such a mounting-hole structure can minimize both the occupation area and volume of a reinforcing support plate intended to enhance the rigidity of the housing of, for example, the display device in a notebook personal computer of the type in which the display device is freely opened or closed, as disclosed in the official gazette of Japanese Patent Application Laid-open No. 6998/1999.

In a case where the external device to which the liquid-crystal display device or the like display device is attached is the housing of the display device of the notebook personal computer or an equipment, such as game machine, whose portability is important, it is an indispensable requisite to lighten and thin the whole system. Therefore, the rigidity of the housing of the external device to which the display device is attached cannot be ensured satisfactorily. Moreover, a thinner and lighter construction is also required of the display device which is to be built in. This trend makes difficult the above contrivances in design that the rigidities of the mechanical members are sufficiently ensured in order to protect the liquid crystal panel from the external stress, and that the gaps are defined between the liquid crystal panel and the illuminator and between the liquid crystal panel and the front frame.

By way of example, in a thinned notebook personal computer of the type in which the display device is freely opened or closed, the thickness of the housing of the display device has been decreased down to 10 [mm] or less. Consequently, it has been sometimes impossible to satisfactorily ensure the rigidity of the housing of the display device or the clearance between the liquid panel and the housing of the display device of the personal computer. In such a case, when the display device of the personal computer is opened or closed, the housing thereof might be twisted, whereby a deformation such as torsion or warp and an external stress such as oppression can be exerted also on the built-in liquid crystal panel through attaching portions (mounting holes and mounting screws, or the likes). Furthermore, since the liquid crystal panel might come into touch with the housing of the display device at positions other than the attaching portions, it can be oppressed in unexpected places.

SUMMARY OF THE INVENTION

This invention has been made in order to solve the problems as stated above, and it has for its object to provide a display device of flat type for displaying images and characters as pursues a thinner and lighter construction, featuring a structure in which the display quality of the display device is not deteriorated by an external stress exerted through a mounting portion.

A display device according to this invention comprises a display portion which displays an image, and a mechanical member which is formed with a mounting portion and which is constructed so as to support the display portion, wherein the mechanical member is locally formed with a part of lower rigidity so that a stress arising from the mounting portion may not propagate to the display portion.

Besides, a display device comprises a display portion which displays an image, and mechanical members which are constructed so as to support the display portion, wherein the mechanical members include a first member which is formed of a thin metal material and which is formed with the mounting portion, and a second member which is fixed to the first member.

In addition, a plurality of such mounting portions are provided, and the second member is fixed to the first member in fixing places whose number is larger than the number of the mounting portions.

Further, the second member is locally formed with a part of lower rigidity.

In addition, the mechanical member is constituted by a first member which is formed of a metal, and a second member which is fixed to the first member and which is formed with the mounting portion, and the second member is locally formed with the part of lower rigidity.

Yet in addition, the part of lower rigidity is a cutout which is provided at a corner of the mechanical member.

Further, the display portion displays the image by utilizing a optical rotatory power of a liquid crystal.

Besides, a display device comprises an illumination portion which is arranged so as to illuminate light from behind the display portion, and the mechanical member is constructed so as to support the illumination portion and is formed so as to prevent a stress from the mounting portion from propagating to the illumination portion.

In addition, the display portion and the illumination portion are arranged in abutment.

Still in addition, the display portion is formed of a liquid crystal panel of reflection type.

Yet in addition, the display portion displays the image by utilizing plasma light emission.

Besides, the display portion displays the image by utilizing electroluminescence.

Further, the display portion is constructed of minute pixels which are arranged in the shape of an array, and electron guns which are arranged in correspondence with the respective pixels.

Still further, the display portion is constructed of minute optical reflectors which are arranged in the shape of an array.

Yet further, the display portion is attached directly to the mechanical member.

BRIEF DESCRIPTION OF THE DRAWINGS

FIGS. 4(a) through 4(c) are views showing the structure of a liquid-crystal display device according to Embodiment 2 of this invention;

FIGS. 8(a) through 8(c) are views showing the structure of a mounting hole portion in the case of side-mounting a liquid-crystal display device in the prior art.

DESCRIPTION OF THE PREFERRED EMBODIMENTS

Embodiment 1

Figure 1A:
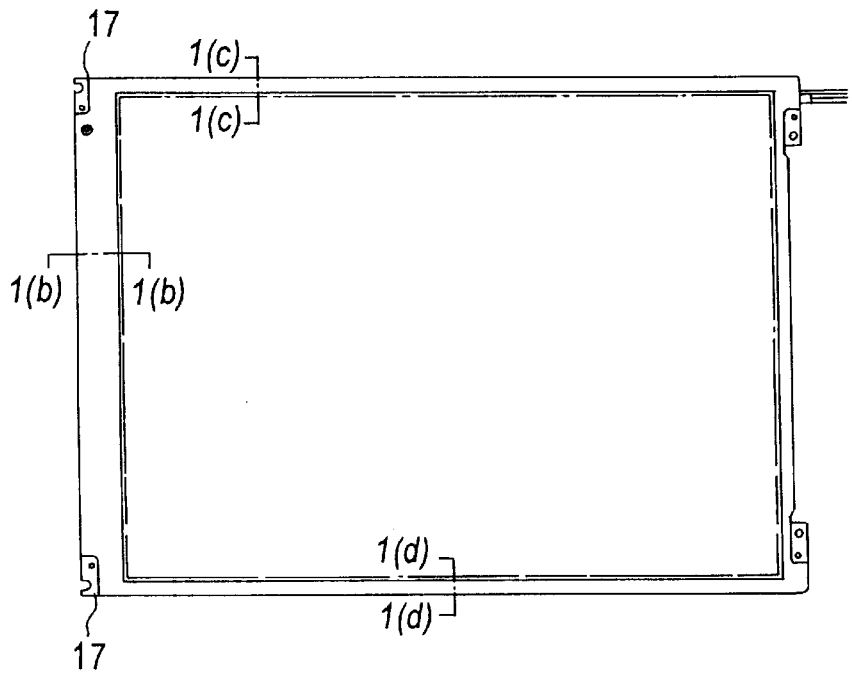
FIGS. 1(a) through 1(d) are views showing the structure of a liquid-crystal display device according to Embodiment 1 of this invention.
Figure 1B:
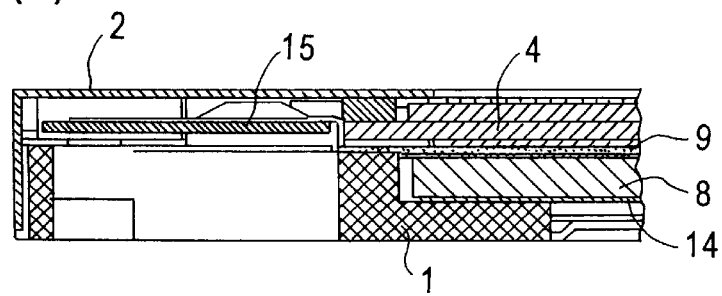
Figure 1C:
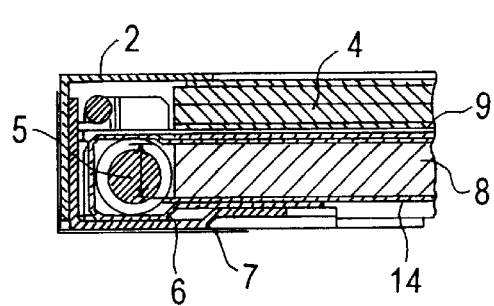
Figure 1D:
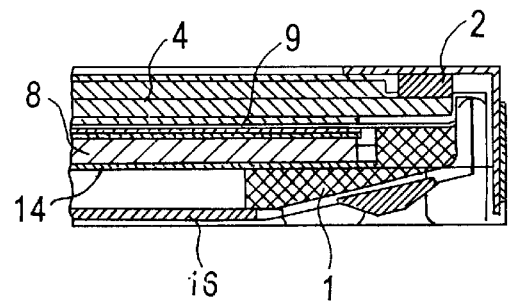

FIGS. 1(a) through 1(d) show the structure of a liquid-crystal display device according to Embodiment 1 of this invention. Concretely, FIG. 1(a) is a plan view, FIG. 1(b) is an enlarged sectional view taken along A—A indicated in FIG. 1(a), FIG. 1(c) is an enlarged sectional view taken along B—B indicated in FIG. 1(a), and FIG. 1(d) is an enlarged sectional view taken along C—C indicated in FIG. 1(a).

Referring to the figures, a mold frame 1 is a second mechanical member which fixes the constituents of the display device in a desired positional relationship. A front frame 2 is a first mechanical member which is formed of a metal. A liquid crystal panel 4 constructs a display portion. A lamp 5 serves as the light source of the liquid crystal panel 4, a lamp reflector 6 reflects the light of the lamp 5, a reflector cover 7 protects the lamp reflector 6, an optical guide plate 8 is formed so as to propagate the emitted light of the lamp 5 to the whole display area and to uniformly illuminate the whole display panel, an optical sheet 9 derives light emergent from the optical guide plate 8, onto the side of the face of the liquid-crystal display device more uniformly and more efficiently, and a reflective sheet 14 is formed so as to reflect light emergent from the optical guide plate 8 backward of the liquid-crystal display device, toward the side of the face, thereby to heighten the utilization efficiency of the light. A circuit substrate 15 includes a circuit for driving the liquid crystal panel 4 in a horizontal direction, while a circuit substrate 16 includes a circuit for driving the liquid crystal panel 4 in a vertical direction. Mounting holes 17 are attaching portions which serve to attach the display device to the desired place of an external device, and which are provided in the mold frame 1.

Figure 2:
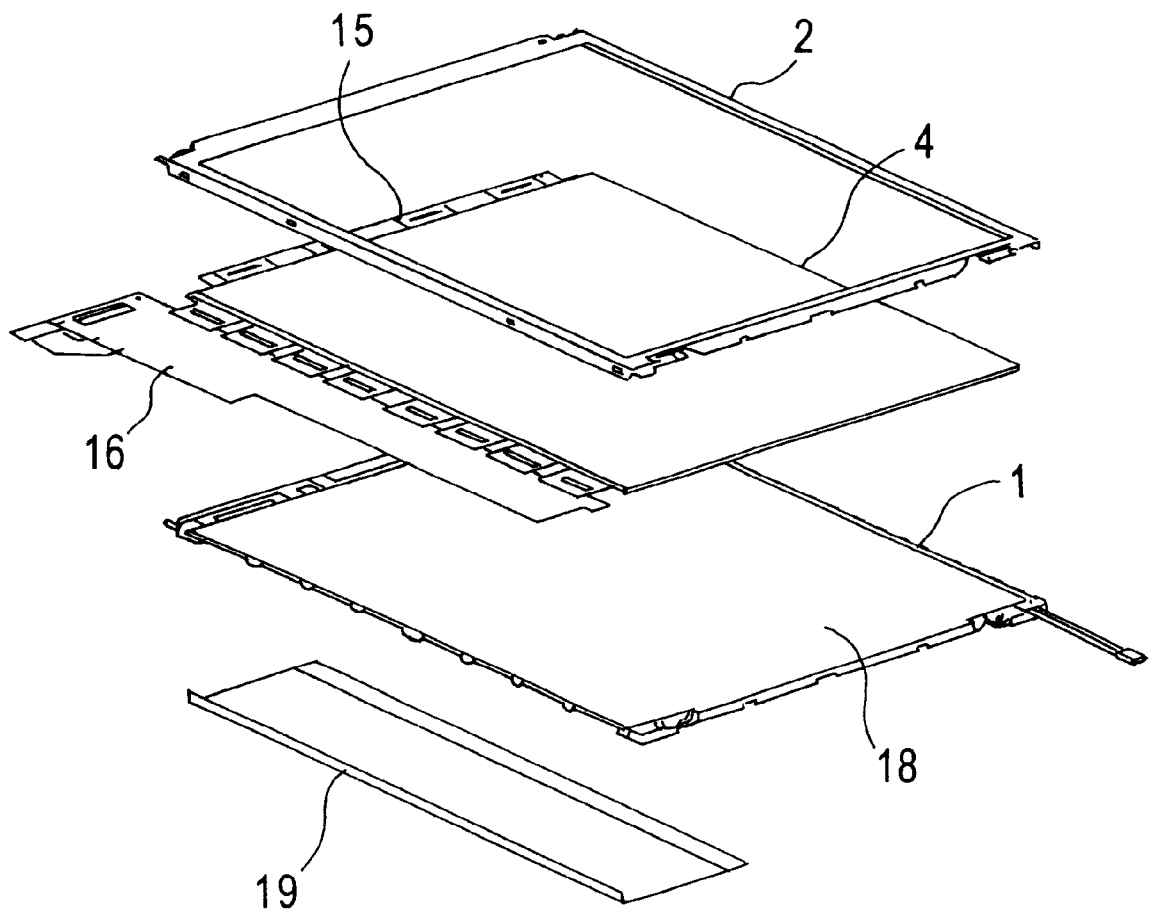
FIG. 2 is an exploded view for explaining the assembled structure of the liquid-crystal display device according to Embodiment 1 of this invention.

FIG. 2 is an exploded view for explaining the assembled structure of the liquid-crystal display device according to Embodiment 1 of this invention.

Referring to the figure, numerals 1, 2, 4, 15 and 16 designate the same components as those in FIGS. 1(a)~1(d), respectively. Numeral 18 indicates an illuminator which is a back light unit. Numeral 19 indicates a rear protective sheet.

With the construction shown in FIG. 2, the illuminator 18 on which the reflective sheet 14, the optical guide plate 8 and the plurality of optical sheets 9 have been mounted, and the liquid crystal panel 4 on which the circuit substrates 15, 16 have been installed, are fitted to the mold frame 1 on which the lamp 5, the lamp reflector 6 and the reflector cover 7 have been mounted beforehand. Subsequently, electrical connections are performed by, for example, folding back the circuit substrates 15, 16. Thereafter, the front frame 2 is fitted, and the resulting structure is fixed by hooks, clinching, screws, an adhesive tape, or the like. Then, the liquid-crystal display device is finished up. As seen from the sectional views of FIGS. 1(b)~1(d), according to Embodiment 1, the liquid crystal panel 4 is put on the illuminator 18 directly without the gap defined therebetween in the prior art, in order to thin the display device.

Figure 3:
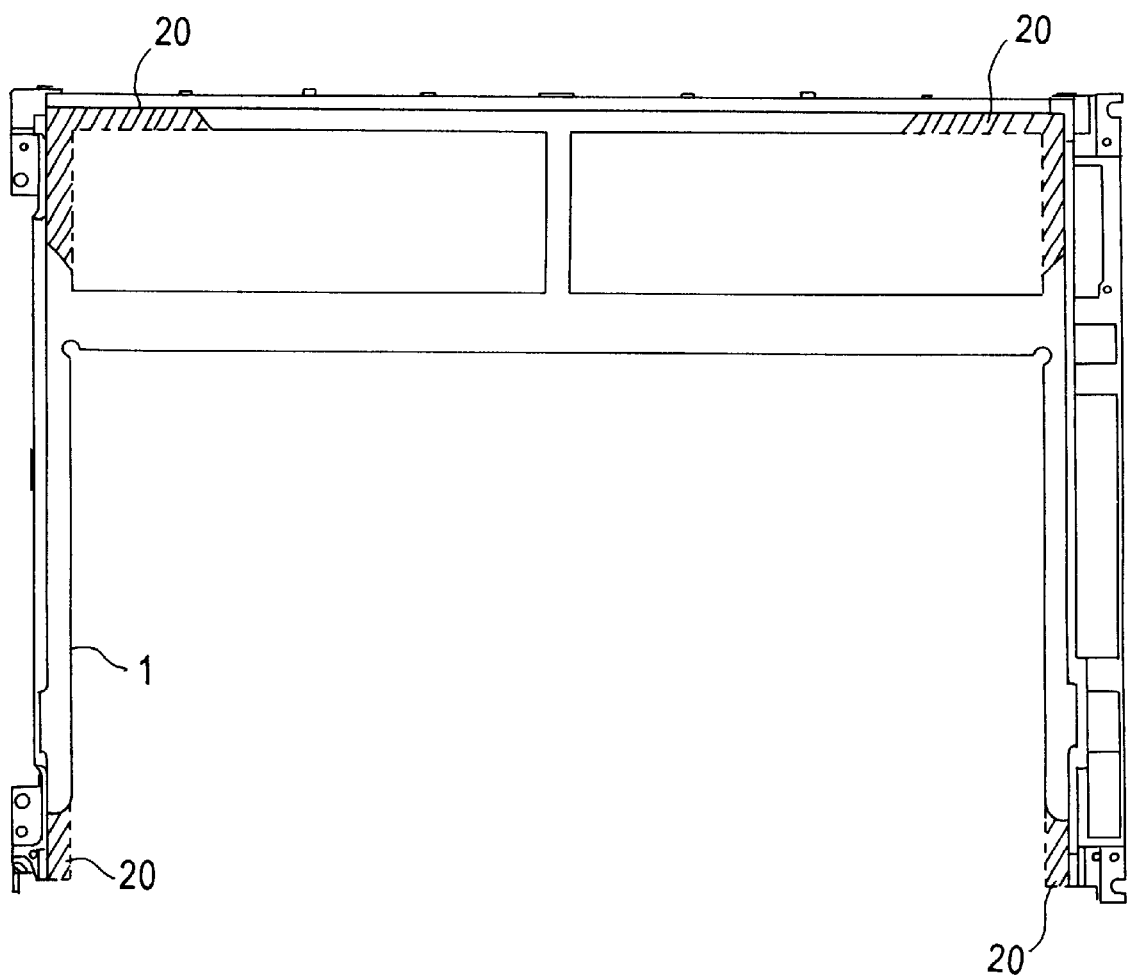
FIG. 3 is a top view showing the plan structure of the mold frame of the liquid-crystal display device according to Embodiment 1 of this invention.

FIG. 3 is a top view showing the plan structure of the mold frame 1 of the liquid-crystal display device according to Embodiment 1 of this invention.

Referring to the figure, numeral 20 designates a cutout which is formed by removing each corner of the mold frame 1. The structure of the mold frame 1 shown in FIG. 3 is provided with the cutouts 20 so as to take away portions which support the optical guide plate 8 from under the corners, and which have hitherto been formed in places where the optical guide plate 8 is fixed.

Owing to the adoption of the structure, the rigidity of the mold frame 1 is lowered in order that external stresses exerted through the mounting holes 17 may be absorbed at the cutouts 20 and may be prevented from propagating inwards more. In other words, the structure features that the deformation of the mold frame 1 having appeared at the portion of the cutout 20 due to the external stress is prevented from propagating to the optical guide plate 8 and the liquid crystal panel 4.

In order to attain the same effect, accordingly, the mold frame 1 is not always restricted to the shape shown in FIG. 3. Essential to the structure of the mold frame 1 are that a portion of lower rigidity is provided in a domain from the mounting hole 17 of the mold frame 1 to, at least, the liquid crystal panel 4, and that, even when the mold frame 1 has been deformed, the deformation is not propagated to any component affecting the display quality of the display device, such as the liquid crystal panel 4 or the illuminator 18.

Embodiment 2

FIGS. 4(a) through 4(c) show the structure of a liquid-crystal display device according to Embodiment 2 of this invention. Concretely, FIG. 4(a) is a side view, FIG. 4(b) is a plan view, and FIG. 4(c) is an enlarged sectional view taken along A—A indicated in FIG. 4(b).

Referring to the figures, numeral 1 designates a mold frame, numeral 2 a front frame made of a metal, and numeral 21 a nut which is mounted on the front frame 2 and which fixes the liquid-crystal display device at a predetermined position. Instead of using the nut 21, it is possible to directly form a screw on the front frame 2 for fixing the liquid—crystal display device.

Figures 5A, 5B:
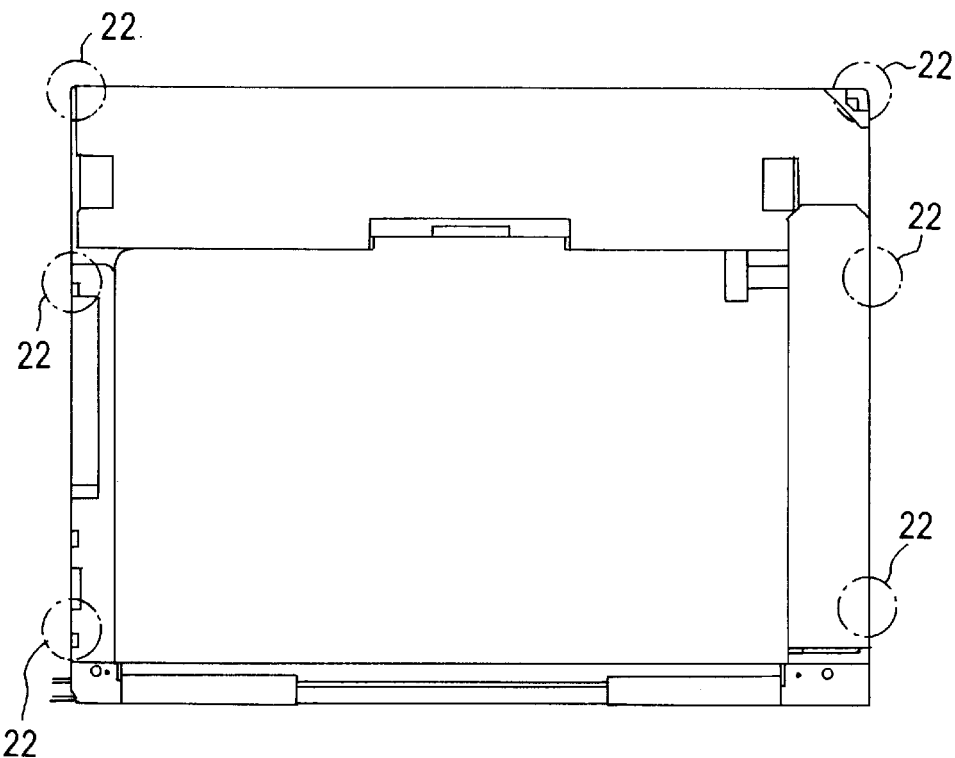
FIGS. 5(a) and 5(b) are views showing a method of fixing the front frame and mold frame of the liquid-crystal display device according to Embodiment 2 of this invention.
Figure 6:
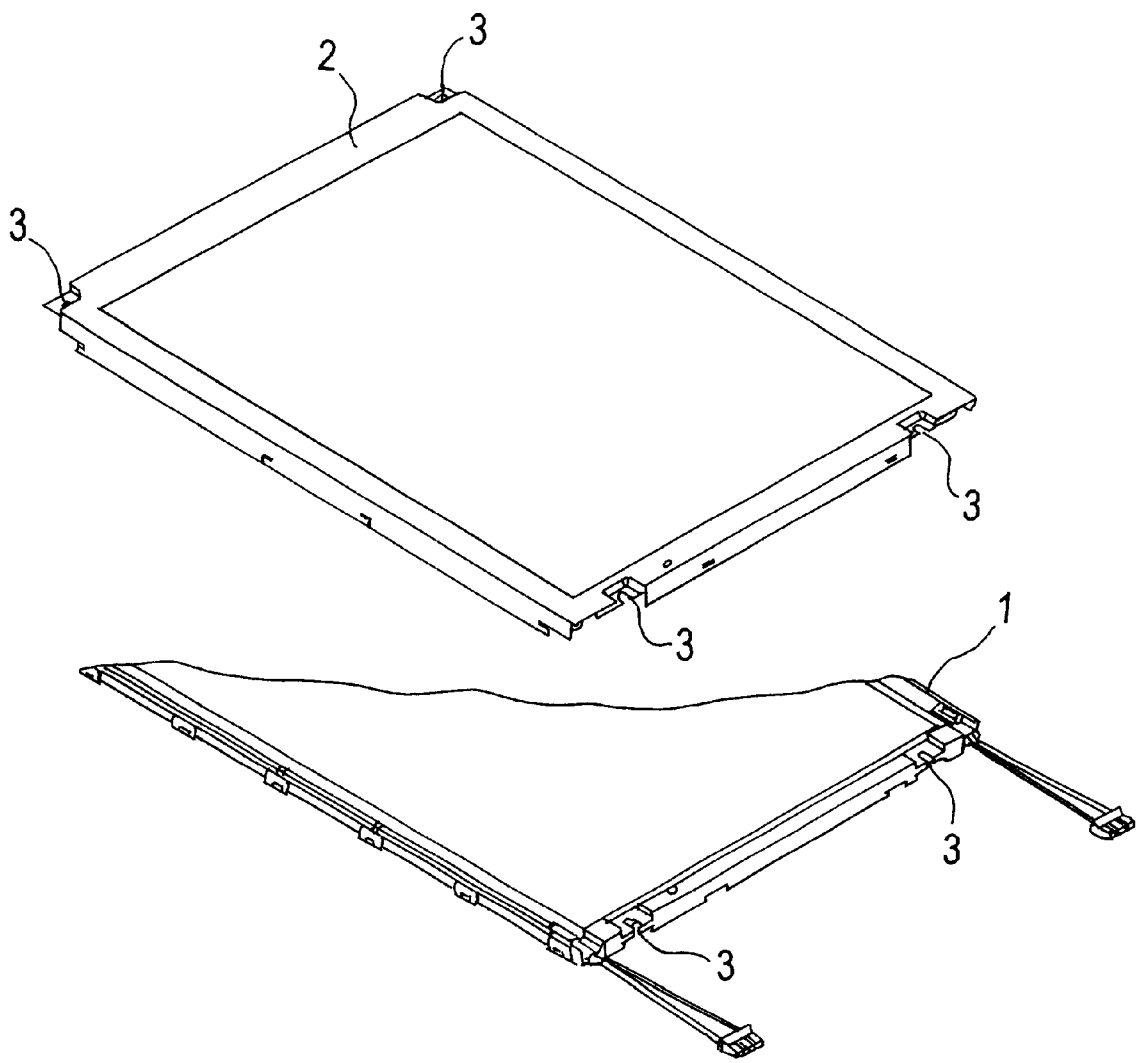
FIG. 6 is a perspective view showing a technique for enhancing a rigidity in a liquid-crystal display device in the prior art.
Figure 7:
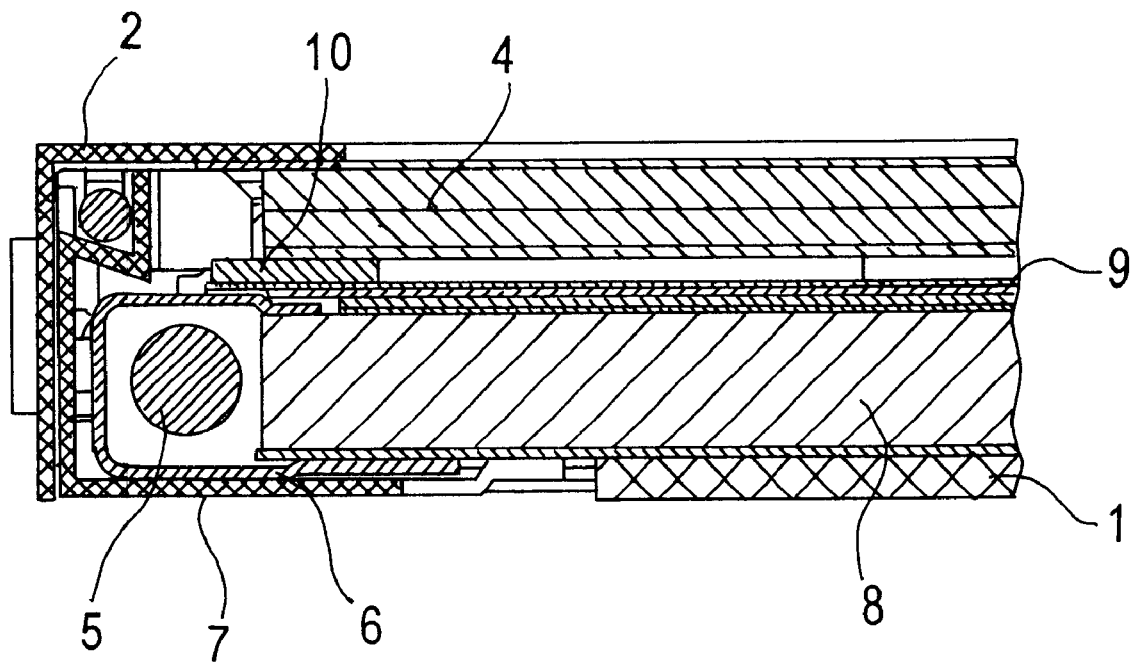
FIG. 7 is a fragmentary view showing a sectional structure in which a gap is defined between a liquid crystal panel and an illuminator in a liquid-crystal display device in the prior art.

FIGS. 5(a) and 5(b) is a view showing a method of fixing the front frame 2 and the mold frame 1 of the liquid-crystal display device according to Embodiment 2 of this invention.

Referring to the figure, numerals 22 indicate fixation portions which are fixed by clinching.

In the liquid-crystal display device thus constructed, an external stress exerted through the nut 21 which forms a mounting hole portion is first propagated to the front frame 2 and is subsequently propagated to the mold frame 1 through the joint parts between the front frame 2 and the mold frame 1. In general, a material employed for the front frame 2 is a steel sheet which is as thin as 0.2~0.6 [mm] or so, and which is effective to absorb the external stress by being locally deformed in compliance with the stress exerted from outside.

Moreover, since the fixation between the front frame 2 and the mold frame 1 is implemented by providing the plurality of fixation portions 22 as shown in FIG. 5, the external stress locally exerted on the front frame 2 through the mounting nut 21 can be distributively propagated to the mold frame 1. As a result, the quantities of displacements which are propagated to the optical guide plate 8 and the liquid crystal panel 4 decrease, so that a deterioration in the display quality of the display device can be prevented.

Although no illustration is made here, also the side-mounting scheme may well conjointly adopt the shape of the mold frame having the cutouts explained in Embodiment 1 (FIG. 3), in addition to the mounting of the nut on the front frame. Thus, a still higher durability can be attained against the external stresses, such as the torsion and the warp, exerted through the mounting hole portions.

Incidentally, although the liquid-crystal display devices have been described in Embodiments 1 and 2, this invention is not restricted to such liquid-crystal display devices. This invention applicable to all image and character display devices of flat type including a display device which utilizes plasma light emission, one which utilizes electroluminescence, one in which minute electron guns are arranged in the shape of an array in a number corresponding to pixels, and one in which minute optical reflectors are arranged in the shape of an array in a number corresponding to pixels.

Besides, in a display device of the type which does not require an illuminator, a display panel can be attached directly to mechanical members.

Since this invention is constructed as described above, it can bring forth effects as explained below.

A display device according to this invention comprises a display portion which displays an image, and a mechanical member which is formed with a mounting portion and which is constructed so as to support the display portion, wherein the mechanical member is locally formed with a part of lower rigidity so that a stress arising from the mounting portion may not propagate to the display portion, so that the stress can be absorbed at the part of lower rigidity.

Besides, a display device comprises a display portion which displays an image, and mechanical members which are constructed so as to support the display portion, wherein the mechanical members include a first member which is formed of a thin metal material and which is formed with the mounting portion, and a second member which is fixed to the first member, so that a stress arising from the mounting portion can be absorbed by the thin metal material.

In addition, a plurality of such mounting portions are provided, and the second member is fixed to the first member in fixing places whose number is larger than the number of the mounting portions, so that a stress can be distributed by the fixing places.

Further, the second member is locally formed with a part of lower rigidity, so that a stress can be absorbed by the part of lower rigidity.

In addition, the mechanical member is constituted by a first member which is formed of a metal, and a second member which is fixed to the first member and which is formed with the mounting portion, and the second member is locally formed with the part of lower rigidity, so that a stress can be absorbed by the part of lower rigidity.

Yet in addition, the part of lower rigidity is a cutout which is provided at a corner of the mechanical member, so that a stress can be absorbed by the cutout.

Further, the display portion displays the image by utilizing a optical rotatory power of a liquid crystal, so that the invention can be also applied to a display device which utilizes the optical rotatory power of the liquid crystal.

Besides, a display device comprises an illumination portion which is arranged so as to illuminate light from behind the display portion, and the mechanical member is constructed so as to support the illumination portion and is formed so as to prevent a stress from the mounting portion from propagating to the illumination portion, so that the invention can be also applied to a display device which employs a liquid crystal panel of transmission type.

In addition, the display portion and the illumination portion are arranged in abutment, so that the display device can be thinned.

In addition, the display portion and the illumination portion are arranged in abutment.

Still in addition, the display portion is formed of a liquid crystal panel of reflection type, so that the invention can be also applied to a display device which employs a liquid crystal panel of reflection type.

Yet in addition, the display portion displays the image by utilizing plasma light emission, so that the invention can be also applied to a display device which employs the plasma light emission.

Besides, the display portion displays the image by utilizing electroluminescence, so that the invention can be also applied to a display device which employs the electroluminescence.

Further, the display portion is constructed of minute pixels which are arranged in the shape of an array, and electron guns which are arranged in correspondence with the respective pixels, so that the invention can be also applied to a display device which includes the electron guns.

Still further, the display portion is constructed of minute optical reflectors which are arranged in the shape of an array, so that the invention can be also applied to a display device which includes the minute optical reflectors.

Yet further, the display portion is attached directly to the mechanical member, so that the display device can be thinned.

What is claimed is:

1. In a display device formed with a mounting portion so as to be attached to an external device; a display device comprising a display portion which displays an image, and a mechanical member which is formed with the mounting portion and which is constructed so as to support said display portion, wherein said mechanical member is locally formed with a part of lower rigidity so that a stress arising from said mounting portion may not propagate directly to said display portion.

2. A display device as defined in claim 1, wherein said mechanical member is constituted by a first member which is formed of a metal, and a second member which is fixed to said first member and which is formed with said mounting portion, and wherein said second member is locally formed with the part of lower rigidity.

3. A display device as defined in claim 1, wherein the part of lower rigidity is a cutout which is provided at a corner of said mechanical member.

4. A display device as defined in claim 1, wherein said display portion displays the image by utilizing a optical rotatory power of a liquid crystal.

5. A display device as defined in claim 1, wherein said display portion displays the image by utilizing plasma light emission.

6. A display device as defined in claim 1, wherein said display portion displays the image by utilizing electroluminescence.

7. A display device as defined in claim 1, wherein said display portion is constructed of minute pixels which are arranged in the shape of an array, and electron guns which are arranged in correspondence with the respective pixels.

8. A display device as defined in claim 1, wherein said display portion is constructed of minute optical reflectors which are arranged in the shape of an array.

9. A display device as defined in claim 4, comprising an illumination portion which is arranged so as to illuminate light from behind said display portion, wherein said mechanical member is constructed so as to support said illumination portion and is formed so as to prevent a stress from said mounting portion from propagating to said illumination portion.

10. A display device as defined in claim 4, wherein said display portion is formed of a liquid crystal panel of reflection type.

11. A display device as defined in claim 9, wherein said display portion and said illumination portion are held in abutment.

12. A display device as defined in claim 10, wherein said display portion is attached directly to said mechanical member.

13. In a display device formed with a mounting portion so as to be attached to an external device; a display device comprising a display portion which displays an image, and mechanical members which are constructed so as to support said display portion, wherein said mechanical members include a first member which is formed of a thin metal material and which is formed with the mounting portion, and a second member which is fixed to said first member.

14. A display device as defined in claim 13, wherein a plurality of such mounting portions are provided, and said second member is fixed to said first member in fixing places whose number is larger than the number of said mounting portions.

15. A display device as defined in claim 3, wherein said second member is locally formed with a part of lower rigidity.

* * * * *